Patented Mar. 21, 1939

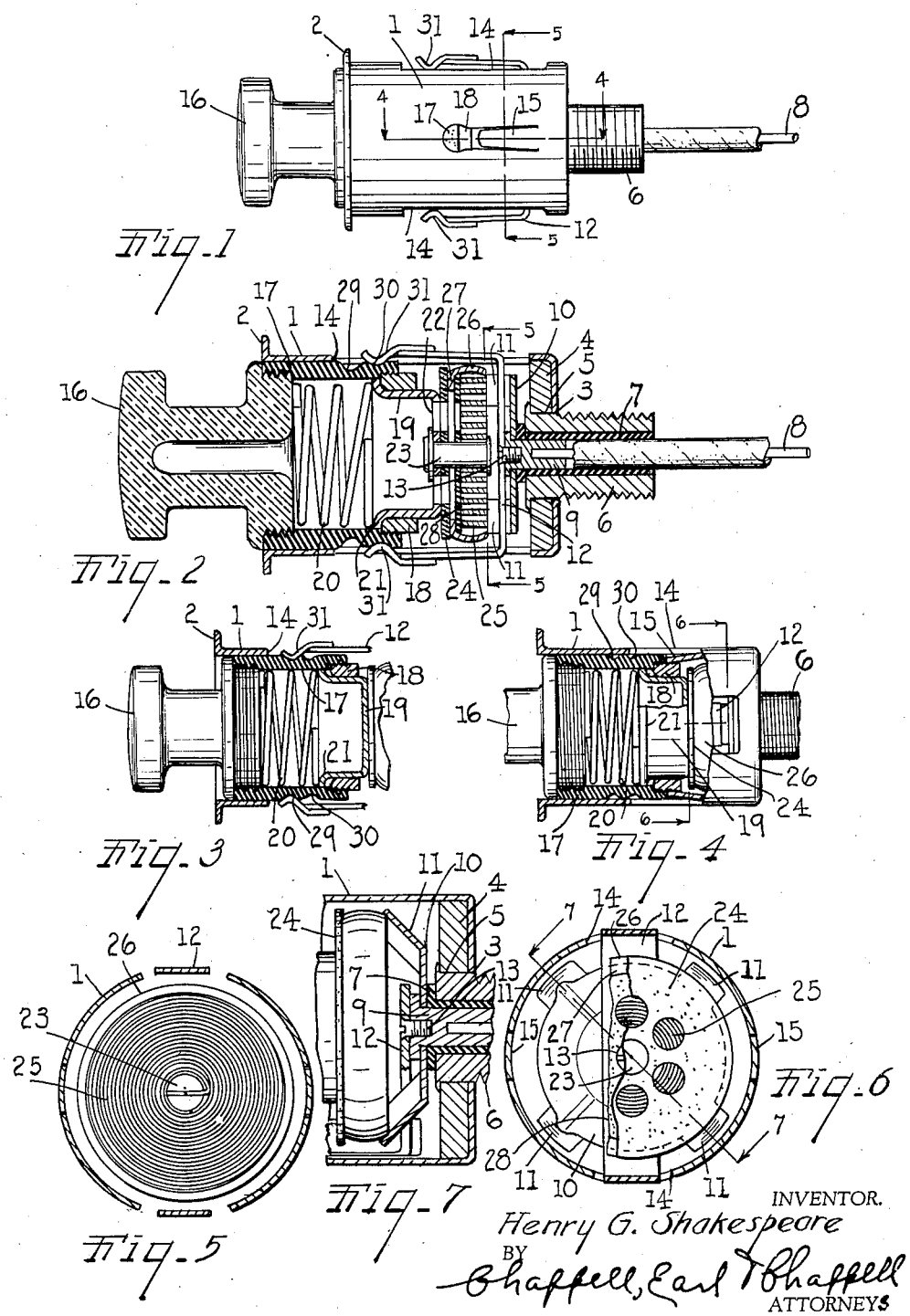

2,151,446

UNITED STATES PATENT OFFICE 2,151,446

ELECTRICAL CIGAR LIGHTER

Henry G. Shakespeare, Kalamazoo, Mich., assignor to Shakespeare Products Company, Kalamazoo, Mich.

Application August 29, 1936, Serial No. 98,434

8 Claims. (Cl. 219—32)

This invention relates to improvements in electrical cigar lighters.

The main objects of my invention are:

First, to provide a cigar lighter, preferably of the type adapted for installation in an automobile, although capable of use in other connections, and characterized by an automatic cut-off whereby the electric heating circuit is broken upon heating of a heating element to incandescence.

Second, to provide a two-part cigar lighter comprising a stationary socket and a removable plug, which is characterized by its simplicity of construction and reliability and speed of operation.

Third, to provide a novel and improved cut-off control for a cigar lighter of the type described, comprising a bimetallic thermostat.

Fourth, to provide a lighter of the type described, which is characterized by its compactness and economy of parts.

Further objects relating to details and economies of my invention will definitely appear from the description to follow. The invention is defined in the claims.

A preferred embodiment of my invention is illustrated in the drawing, wherein:

Fig. 1 is a side elevational view of the lighter of my invention.

Fig. 2 is an enlarged view mainly in longitudinal section.

Fig. 3 is a fragmentary sectional view partially in longitudinal section, illustrating details of the plug of my lighter.

Fig. 4 is a fragmentary view partially broken away and in longitudinal section, illustrating the coaction of the contacts of my lighter in operative position.

Fig. 5 is a transverse section on the line 5—5 of Figs. 1 and 2.

Fig. 6 is an enlarged detail view partially in transverse section on the line 6—6 of Fig. 4.

Fig. 7 is an enlarged fragmentary view partially in section on the line 7—7 of Fig. 6, illustrating the contact formed between the annular contact element on the movable plug and the resilient ears on the stationary member.

Cigar lighters of the type adapted for installation on an automobile, to be operated by the battery or generator thereof and characterized by a stationary member grounded to the automobile and supplied with current from the source of electrical energy, together with a movable plug insertable in the stationary member, are well known. In such devices, it is customary for one desiring to light a cigar or cigarette to push the movable member or plug into the stationary member or socket, holding the parts in that position until the heating element carried by the movable member reaches incandescence. The disadvantages of this type of lighter are apparent. Not only is the operation sometimes inconvenient, due to location of the lighter relative to the automobile cowl, dash or instrument board where it is usually installed, but also considerable danger is involved because of the fact that the operator's attention is distracted from the road. Still further, it is often the case that the heating element is insufficiently heated by the current flowing therethrough, due to not having been subjected thereto for a long enough period, with the result that annoyance is caused.

The lighter of my invention eliminates the above noted objections, since it is provided with automatic means for holding the movable or removable element until it becomes heated to a predetermined degree or attains a sufficient incandescence and for then releasing the same, whereby it springs or snaps back to an inoperative position with an attendant snapping noise which is distinctly audible. The movable element may then be removed and applied to the cigar, cigarette, or pipe desired to be lighted. The mechanism enabling this operation broadly consists of a bimetallic thermocouple embodied in a novel manner in relation to the stationary and movable elements and will be more particularly described in the specification to follow.

Referring to the drawing, the stationary member or socket of my lighter is designated by the reference numeral 1 and is intended to be mounted in the cowl or instrument board or in a suitable holding clamp attached to some relatively fixed part of an automobile, an annular flange 2 being struck up from the socket body to serve as a decorative stop member or escutcheon. The socket is apertured centrally of its bottom at 3 and a metallic disk 4 is fitted within the socket to seat against the bottom, the disk being likewise apertured at 5. A hollow cylindrical fitting 6 is inserted in the apertures 3 and 5 and has a threaded end which is adapted to coact with a nut (not shown) to retain the socket in fixed position in the supporting member. It will be understood that the socket is grounded in the usual or any suitable manner through the automobile body.

A shouldered sleeve 7 of insulating material is placed in fitting 6 and receives an insulated wire 8 adapted to be connected to a suitable source of current supply. Sleeve 7 forms a mounting for a central conducting post 9 to which the wire 8 is electrically connected, and the post retains a spring contact disk 10 firmly against the shoulder of insulating sleeve 7. Thus, it will be seen that the spring contact disk is thoroughly insulated from fitting 6 and socket 1.

The disk 10 is provided with a plurality of resilient contactors or ears 11, preferably four in number, which are illustrated in Fig. 6. Post 9 carries at its outermost end a U-shaped bimetallic thermostat element 12 which is secured thereto by means of screw 13.

The legs of the U-shaped thermostat extend outwardly and radially through slots or openings 14 formed in the socket 1. I have illustrated a device having a bimetallic or thermostatic element comprising a pair of resilient arms. However, I do not intend to be restricted to this form, as a plurality of resilient legs or segments might be employed.

Socket 1 is provided with a pair of resilient contact arms 15 which are stamped therefrom and extend slightly inwardly and toward the flanged end of the socket.

This completes the description of the stationary member, which may be summarized as comprising, broadly, resilient contactors 11 connected to a source of current supply and spring contact arms 15 integral with the socket 1 which is insulated from the contactors and connected to ground. Further, the stationary element comprises a resilient bimetallic thermostat adapted to be quickly heated so as to flex outwardly in slots in the socket to break the electrical connection between the stationary member and the plug, which will be hereinafter described.

The plug or removable element comprises a handle 16 which may, if desired, be hollow or translucent in order to transmit the glow from the incandescent heating element, but which may just as well be made opaque so far as operation is concerned. The handle is threadedly connected with a shell 17 of a suitable insulating material, which shell is slidable axially in the socket 1. The shell has mounted in fixed relation thereto at its inner end a ring 18 of conducting material, and a metallic cap or thimble 19 is in sliding relation to ring 18 interiorly of the same so as to be in electrical contact with the ring at all times. The spring 20 acts to urge the removable element yieldingly outward. The thimble is struck out annularly or flanged at 21 to restrain its outward movement relative to the ring 18.

The thimble 19 is apertured at a plurality of points, as at 22, to permit glow from the heating element, to be hereinafter described, to be visible if a translucent handle is employed. However, these apertures may be omitted if desired. The thimble 19 has mounted centrally thereof a stud or rivet 23 carrying an apertured insulating disk 24. A convolutely coiled heating element 25 is connected at its inner end to the stud 23 in a kerf, and at its outer end it is joined by welding or otherwise to an annular rounded contact 26 having an inwardly extending circumferential shoulder 27 resting between the disk 24 and a further perforated insulator disk 28.

The ring 18, mounted on the movable plug, constitutes a circular contact which engages the inwardly extending arms 15 when the plug is pressed inwardly to the maximum extent, as illustrated in Fig. 4. The annular contact 26, which is insulated from the ring 18, constitutes a further contact adapted to engage the resilient ears 11 at the same time. Thus, it will be seen, when the plug is fully pressed inward, a circuit is completed from the wire 8 through the disk 10 and ears 11, the annular contact 26, heating element 25, stud 23, thimble 19, ring 18, arms 15, socket 1, and ground.

For maintaining the plug in its innermost operative position, I provide insulating shell 17 with a pair of external circumferential grooves 29 and 30. The free ends of the resilient legs of the U-shaped bimetallic element are inwardly bent to form nibs 31 adapted to engage in grooves 29 or 30, depending on whether the plug is in its innermost position or not. Assuming that pressure has been exerted on handle 16 to force annular contact 26 into electrical engagement with spring ears 11 against the resistance of the ears, as well as that of coil spring 20, an electrical circuit will be completed as described above. This circuit will cause the heating element to become incandescent, with the result that the bimetallic thermostat will be heated by radiation. Thus, the gripping effect of nibs 31 in groove 29 will be lessened and after a certain time the plug will be thrust outwardly under the impulse of resilient ears 11. Upon breaking contact with ears 11, nibs 31 will engage in groove 30 to hold the plug until it is removed by the user. The engagement of nibs 31 in groove 30 causes a snapping noise or signal which is distinctly audible and amply sufficient to notify the user that the lighter is ready for use. Accordingly, the provisions relating to the transparency of the handle portion may be omitted since it is not even necessary for the user to remove his gaze from the road in order to determine if the lighter may be used.

From the foregoing, it will be appreciated that I have devised a lighter of great utility and convenience. From a practical standpoint, the lighter of my invention is meritorious since the thermostat arrangement is simple and does not involve an undesirable number of moving parts with their tendency to wear and resultant poor operation. Further, the construction of my device is made substantially less costly, hence the device may be marketed at an attractive price.

I have described my device in connection with its use on an automobile, since that is probably the field of its greatest application. However, I do not wish to be limited in this respect, inasmuch as my lighter lends itself to being mounted in nearly any conceivable connection.

I have illustrated and described my improvements in an embodiment which I have found very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. In an automatic cut-off lighter, a stationary socket, a movable plug received in said socket and carrying a heating element, contacts on said socket and plug for establishing an electric circuit through said heating element, said circuit being made when said plug is in innermost position in said socket, means for holding said plug in said innermost position, comprising a relatively fixed element terminating in a rounded nib engaging resiliently in a groove in said plug, said relatively fixed element being adapted to flex upon heating of the heating element to incandescence whereby to lessen the holding effect of the relatively fixed element, and means for repelling the plug from innermost position against the lessened holding effect to break the circuit, said plug having a recess engageable by the nib to resiliently hold the plug in repelled position.

2. In an automatic cut-off lighter, a stationary socket, a movable plug received in said socket and carrying a heating element, contacts on said socket and plug for establishing an electric circuit through said heating element, said circuit being made when said plug is in innermost position in said socket, means for frictionally holding said plug in said innermost position, comprising a relatively fixed element secured to the socket and resiliently engaging said plug, said relatively fixed element being adapted to flex upon heating of the heating element to incandescence whereby to lessen the holding effect of the relatively fixed element, and means for repelling the plug from innermost position against the lessened holding effect to break the circuit, said plug having a recess engageable by the relatively fixed element to resiliently hold the plug in repelled position.

3. In an automatic cut-off lighter, a stationary socket member, a movable plug member received in said socket and carrying a heating element, contacts on said socket and plug members for establishing an electric circuit through said heating element, said circuit being made when said plug member is in innermost position in said socket, means on one of said members for frictionally holding said plug member in said innermost position, the other member having provision for operatively receiving said means, said means being adapted to flex upon heating of the heating element to incandescence whereby to lessen the holding effect of said means, and means for repelling the plug from innermost position in the socket member, said other member having further provision for receiving the holding means to resiliently hold the plug member in repelled position.

4. In an automatic lighter, a socket, a plug carrying a heating coil, means for causing a current to flow through said coil when said plug is pressed into said socket, means for holding said plug in said socket and for releasing said plug when the heating coil reaches incandescence, comprising an insulating shell on the plug having a pair of annular grooves, a resilient U-shaped thermostatic element having nibs engaging in one of said grooves in operative position of the plug and socket, said element flexing upon being heated by said coil to release said nibs from said groove, and means to eject said plug from operative position when released by said element, said nibs then snapping into the other groove.

5. In an automatic lighter, a socket, resilient contact ears in said socket, a plug carrying a heating coil, means for causing a current to flow through said coil when said plug is pressed into said socket against said contact ears, and means for holding said plug in said socket and for releasing said plug when the heating coil reaches incandescence, comprising a thermostatic element engaging said plug in operative position of the plug and socket, said plug having a recess engaged by the element to hold the plug in operative position, said element flexing upon being heated by said coil to lessen the holding effect of said element on said plug, said ears then repelling said plug, said plug having a further recess engaged by the element to resiliently hold the plug in repelled position.

6. In an automatic lighter, a socket, a plug having a holding recess, a heating coil, means for causing a current to flow through said coil when said plug is pressed into said socket, means for holding said plug in said socket and for releasing said plug when the heating coil reaches incandescence, comprising a resilient thermostatic element having a position frictionally engaging said plug to hold the same in operative position of the plug and socket, said element acting upon being heated by said coil to lessen the holding effect of the element, and means to eject said plug from operative position against the lessened holding effect of said element, said element when ejected snapping into the recess in the plug to resiliently hold the same in ejected position.

7. In an automatic lighter, a stationary member comprising a socket of conducting material having contact arms stamped out in the side thereof, a central post carried by said socket and insulated therefrom, means connecting said post to a source of electrical energy, a spring contact disk having a plurality of resilient contact ears in electrical connection with said post, and a resilient U-shaped thermostatic cut-off element secured to said post, said socket having apertures on the sides thereof wherein the legs of said U-shaped element are received, said legs terminating in offset plug engaging catches, and a movable plug received by said socket and comprising a heater element, an outer annular contact connected to one end of said heater element and adapted to contact said contact ears in the operative position of said plug and socket, a slidable connecting thimble electrically connected to the other end of said heater element and insulated from said annular contact, a conducting ring surrounding said thimble in constant sliding electrical contact therewith and adapted to engage said contact arms in the operative position of the plug and socket, a cylindrical shell of insulating material, and a handle, said cylindrical shell being fixedly mounted between said handle and ring, said heater element, annular contact and thimble being movable relative to said shell and resiliently urged outwardly from the same, said shell having a pair of external circumferential grooves adapted to receive the plug engaging catches of the thermostatic element, whereby when the plug is held in operative position in the socket by the engagement of the resilient catches with the outer groove, heating of the thermostatic element causes the release of the catches from that groove under the actuation of the resilient ears and the engagement of the catches in the inner groove to break the electrical contact between the annular contact and ears and the sleeve and arms.

8. In an automatic lighter, a stationary member comprising a socket of conducting material having contact arms stamped out in the side thereof, a central post carried by said socket and insulated therefrom, means connecting said post to a source of electrical energy, a plurality of resilient contact ears in electrical connection with said post, and a resilient thermostatic cut-off element secured to said post, said element terminating in offset plug engaging catches, and a movable plug received by said socket and comprising a heater element, a contact connected to one end of said heater element and adapted to contact said contact ears in the operative position of said plug and socket, a movable means electrically connected to the other end of said heater element and insulated from said contact, a conducting element surrounding said movable means in constant sliding electrical contact therewith and adapted to engage said contact arms in the operative position of the plug and socket, a cylindrical shell of insulating material, and a handle, said cylindrical shell being fixedly mounted between said handle and conducting element, said heater element, contact and movable means being movable relative to said shell and resiliently urged outwardly from the same, said shell having a pair of external circumferential grooves adapted to receive the plug engaging catches of the thermostatic element, whereby when the plug is held in operative position in the socket by the engagement of the resilient catches with the outer groove, heating of the thermostatic element causes the release of the catches from that groove under the actuation of the resilient ears and the engagement of the catches in the inner groove to break the electrical contact between the contact and ears and the sleeve and arms.

HENRY G. SHAKESPEARE.